Figure 1:
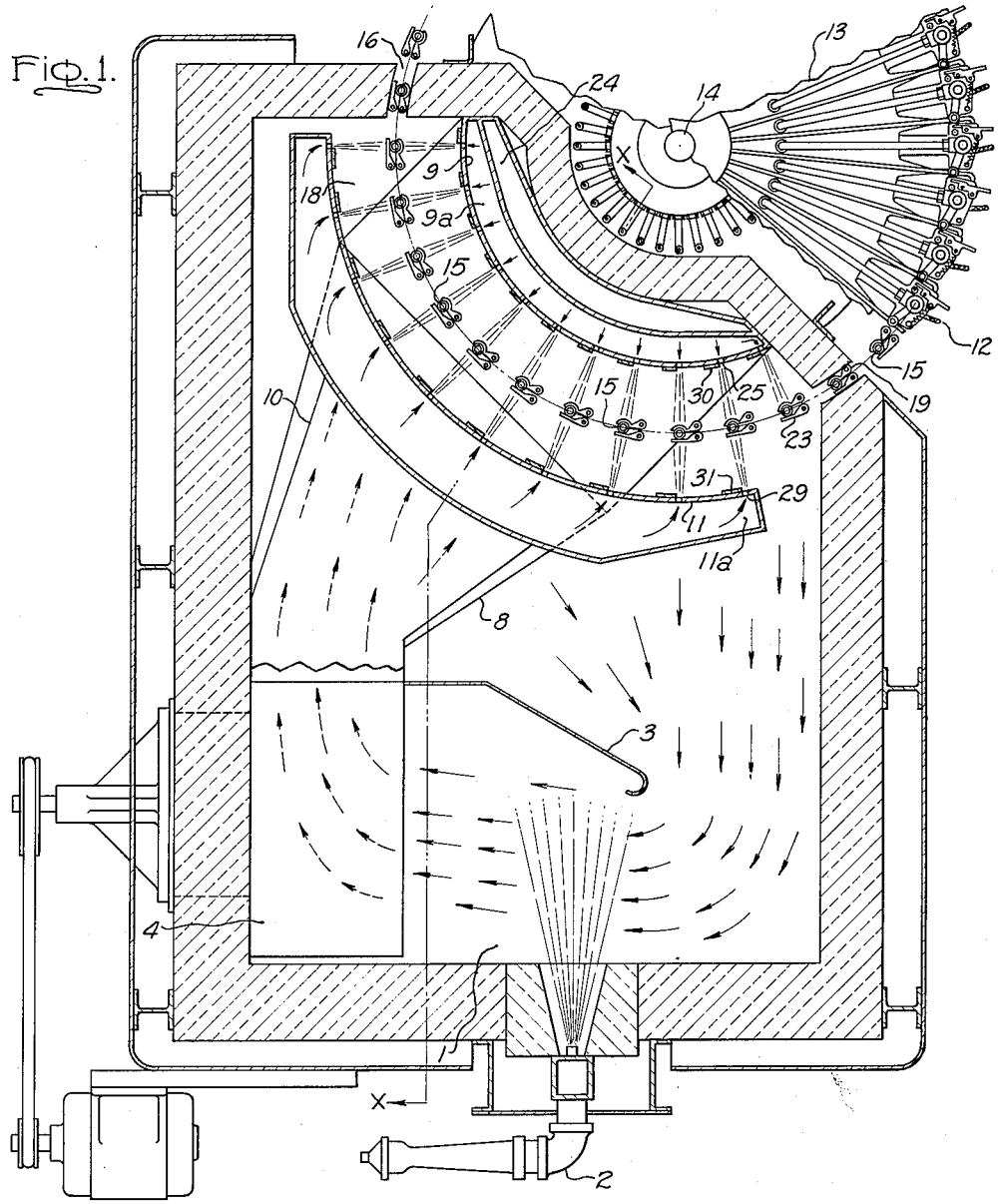

March 28, 1961 G. E. OTT 2,977,104
LAMP MAKING MACHINE
Filed Aug. 7, 1958 3 Sheets-Sheet 1

Inventor:
George E. Ott,
by Andrew J. Booz
His Attorney.

March 28, 1961

G. E. OTT 2,977,104

LAMP MAKING MACHINE

Filed Aug. 7, 1958

3 Sheets-Sheet 2

Inventor:
George E. Ott,
by Andrew J. Booth
His Attorney.

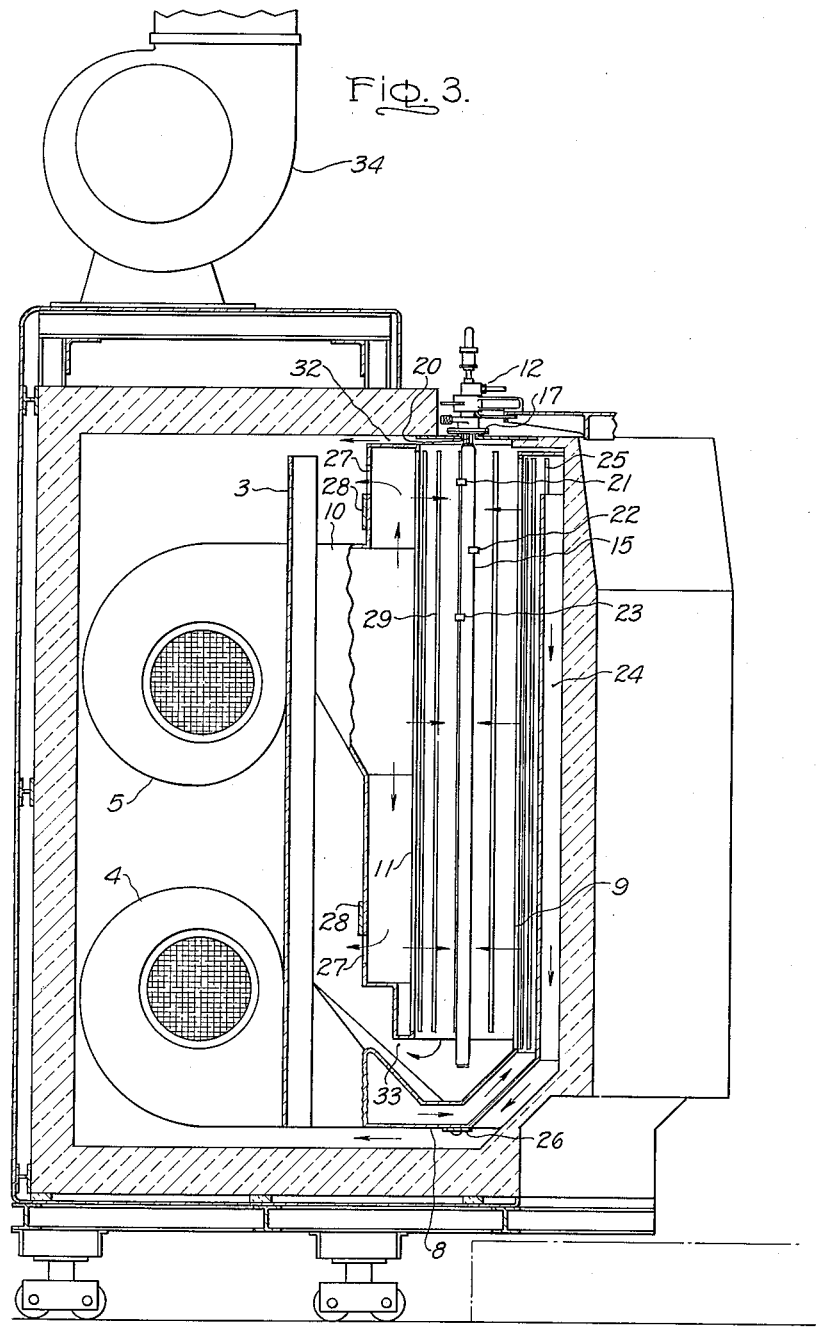

United States Patent Office 2,977,104
Patented Mar. 28, 1961

2,977,104
LAMP MAKING MACHINE

George E. Ott, Eastlake, Ohio, assignor to General Electric Company, a corporation of New York Filed Aug. 7, 1958, Ser. No. 753,754

3 Claims. (Cl. 263—7)

This invention relates to automatic machines for manufacturing electric lamps and discharge devices. More particularly, this invention relates to an automatic machine having in combination therewith an improved oven construction for heating lamps and discharge devices at a succession of work stations.

An indexing type of machine, which advances the article to be manufactured to each of a succession of work stations is widely used for the manufacture of lamps and discharge devices. Such machines frequently have heating apparatus in combination therewith to heat the lamps or discharge devices to condition or bake out a coating on the envelope of said lamps or discharge devices. Some difficulty has been experienced in maintaining a uniform temperature gradient throughout the entire combustion and heating space of the apparatus since any stratification of air in the combustion area may appear in the bulb heating area of the oven. According to the instant invention, these and other difficulties previously encountered have been overcome.

One object of the invention is to produce an improved lamp manufacturing machine in combination with an oven for heating the lamps wherein uniform heating of the lamps or discharge devices is achieved.

Another object of the invention is to provide an improved oven construction for heating lamps and discharge devices at a succession of work stations.

Briefly stated, according to the instant invention, the aforesaid objects are achieved by an improved oven construction wherein the velocity of hot gases circulating through the oven are reduced, the direction of the hot gases changed, and, a greater amount of radiating surface provided. The oven is provided with ducts having vertical walls of radiating material which define a horizontal passageway through the oven and which are vertically aligned with the path of movement of the lamps as the lamps are carried by the indexing machine through the oven. Both vertical walls have a series of openings or vertical slots positioned at the index stations so that blowers may pick up a supply of hot air from the combustion area and force it through the ducts to the vertical walls forming the passageway, and then through openings in the walls.

In this manner, a balanced air pressure may be maintained on each side of the lamp and therefore there is no tendency of the lamp to be blown out of the holder. Likewise, the arrangement of the ducts is such that the heated air travels vertically rather than in the direction of the bulb and thereby the air is prevented from achieving sufficient volume and velocity to possibly blow a bulb out of its holder. This vertical movement is attained by having the ends of the ducts spaced from the walls of the oven so that the vertical walls are, in effect, open at their tops and bottoms to permit the flow of air into the combustion chamber which is at a slightly lower pressure than that portion of the oven through which the bulb travels. The air will therefore go across the top and bottom of the walls into the combustion chamber and there is little or no movement of the air parallel to the path of the bulb. Some of the air is directed through slots in the walls onto opposite sides of the lamps.

By providing for the vertical wall on each side of the long passageway to be of the same material having similar radiation properties, more uniform heating on each side of the bulb may be achieved. Each vertical wall is maintained at an elevated temperature by the passage of additional heated air, beyond that passing through the slots, adjacent to the wall. This additional air is then recirculated to the combustion chamber and is therein reheated.

Figure 2:
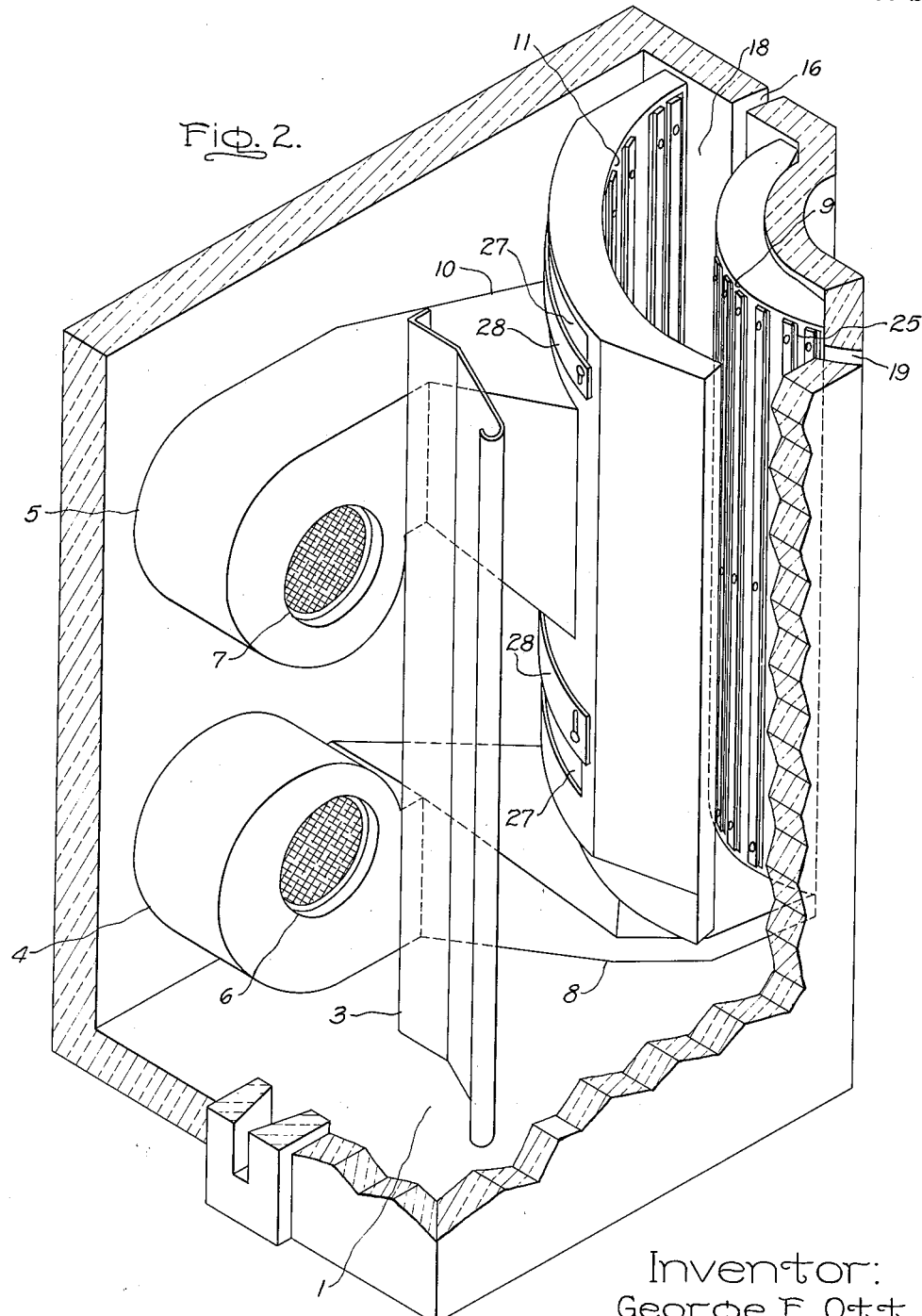

Other objects and features of the invention will appear from the following detailed description of a species thereof and from the drawings, wherein:

Fig. 1 is a plan view, partly in section, of a lamp making machine including a series of lamp holding heads, Fig. 2 is a diagrammatic perspective view showing certain elements of the oven, and Fig. 3 is a vertical section of a peripheral portion of the exhaust machine taken along the vertical plane X, X in Fig. 1.

Referring to the figures, the oven illustrated in the drawings comprises an interior combustion or heating chamber 1 which communicates with a series of burners 2 extending vertically in line throughout the height of the heating chamber 1. A baffle 3 directs the flow of air to the heating chamber 1 and confines the heated air to the heating chamber 1. On one side of the chamber 1 are two blowers 4, 5 (Fig. 2). The blowers 4, 5 have their intake or suction side 6, 7 projecting into the chamber 1. The blower 4 picks up a supply of hot air from the combustion area, carries it in a duct 8 running along the bottom of the oven and then to a duct 9a in the outer vertical wall 9 as hereinafter explained. The other blower 5 also picks up heated air from chamber 1 and conducts it through a duct 10 to duct 11a in the inner vertical wall 11, as hereinafter more fully explained.

The oven is located to span a succession of work stations about a machine for exhausting elongated tubular lamps and to condition a coating of fluorescent material on the inner surface of such lamps. The oven is arranged below lamp carrying heads 12 of the exhaust machine, which heads are regularly spaced about the periphery of a turret 13 which rotates on a center column 14. The exhaust machine may be, but is not necessarily, of the index type shown in the United States Patent 2,247,513, Marshaus, dated July 1, 1941, which patent is assigned to the assignee of the present invention. The exhaust machine provides for certain operations in the manufacture of fluorescent lamps to take place, as the heads 12 are indexed in a counterclockwise direction about the machine by movement of the turret or carrier 13. An elongated tubular fluorescent lamp 15 is retained in a vertical position below each head 12 and is carried into an opening 16 in the end of the oven while almost all of the head 12 remains above said oven and maintains a connection to the lamp 15 through means extending through a slit 17 (Fig. 3) in the top of the oven. The normal indexing motions of the turret 13 advance the lamp 15 through the length of an arcuate passageway 18 formed by the aforesaid vertical outer wall 9 and the vertical inner wall 11 of the oven. The lamp 15 passes from the oven through opening 19 at the end of the passageway 18 therein.

Each lamp 15 is connected to the head 12 by an exhaust tube 20 extending upwardly from the lamp into the head 12, and is supported by the gripping action of jaws 21, 22 and 23 in engagement with an outer portion of the tubular envelope 15. The jaws 21, 22 and 23 advance with the turret 13.

The direction of flow of air in the oven is illustrated by the arrows. As previously stated, the blower 4 sucks heated air from the chamber 1 and passes the air through duct 8 and into duct 9a in the outer vertical wall 9. In order to provide a hot radiating surface on the outer side of the bulb with the circulating hot gases heating the metal to a radiating temperature, a portion of the air in the duct 9a of outer wall 9 is returned down the back side of the wall through bypass duct 24 (Figs. 1 and 3), below duct 8 and back to the heating chamber 1 for reheating. The vertical wall 9 has variable vertical slots 25 positioned at each bulb index position; a portion of the air in the duct 9a passes through these slots 25 and is directed against a lamp 15 in the index position. It is possible to control the amount of air blowing on a bulb by adjusting the slots 25 in line with the bulb and controlling the velocity and pressure of this air by restricting the amount of air returning to the combustion chamber by the positioning of a damper door 26 (Fig. 3).

A similar arrangement is provided for the duct on the other side of the bulb with the exception that the air from the blower 5 is put in at the top of the duct and a portion of the air is bypassed and returned back into the combustion chamber from the bottom and top of the same duct through openings 27. The flow of air out of the openings 27 in vertical wall 11 may be regulated by the vertical positioning of damper doors 28. The circulating hot gases in this way heat the metal of vertical wall 11 to a radiating temperature. Vertical wall 11 has adjustable slots 29 in a vertical line positioned at each bulb index station. As with the outer wall 9, it is likewise possible to control the amount of air blowing on a bulb through slots 29 by adjusting the vertical dampers in line with the bulb and controlling the velocity and pressure of this air by restricting the amount of the air returning into the combustion chamber through opening 27.

The air flowing through the adjustable slots 25 and 29 may be regulated by the movement of damper doors 30, 31 respectively thereby aiding in controlling the amount of air flowing on the bulb.

The vertical walls 9 and 11 are preferably made of material having good radiating properties, such as stainless steel, so that radiation may occur from the vertical walls 9 and 11 to the lamp bulb.

The inner wall 11 has openings above and below the wall which form ducts 32, 33 (Fig. 3) connecting the passageway 18 with the heating chamber 1. This facilitates vertical movement of air in the passageway 18, upward or downward, and the return of the air to the heating chamber 1 through ducts 32, 33.

The entrance of lamps 15 into the passageway 18 immediately subjects them to the heated air constantly being circulated therethrough, the air flowing through slots 25, 29 and then in an upward or downward direction and around the outer vertical wall 11 and through ducts 32, 33. Since the combustion chamber is at a slightly lower pressure than that portion of the oven through which the bulbs travel, the air goes around the top and bottom of the wall into the combustion chamber and there is little or no movement of the air parallel to the path of the bulb movement.

Fuel, such as natural gas, and air needed for combustion is injected under pressure through the burners 2. The burners 2 may consist of a number, for example, 4 burners, vertically aligned and extending from near the bottom to near the top of the combustion chamber 1. The circulating air physically intermixes with the hot products of combustion before being drawn into the inlet openings 6 and 7 of the blowers 4 and 5 respectively. The arrangement of the burners 2 aids in provding the proper heat distribution along the entire vertical height of the oven so that the air is heated quite uniformly by the time it is withdrawn from the combustion chamber 1 by the intake openings 6, 7. The excess air in the oven is drawn off by the exhaust blower 34 (Fig. 3) so that an excessive build up of pressure will not occur in the oven and the tendency for the heated air to leak out through openings 16 and 19 is minimized. Such a leakage of air through openings 16 and 19 is objectionable because of the resulting discomfort to the operators of the machine and because of its harmful effects on the indexing machine.

Since it is desirable that the lamps 15 be heated both as rapidly and uniformly as possible a high rate of circulation of air is preferred and consequently high capacity blowers 4 and 5 are provided. The blowers 4 and 5, shown in a machine combination suited to the manufacture of the common 80 watts, 8-foot-long fluorescent lamps, draws the heated air from the combustion chamber 1 at the rate of approximately 16,000 cu. ft. per min. and is of a construction to permit it to operate with air at a temperature of 650 to 900° C. The blowers are completely enclosed, except for their drive shafts, within the heavily insulated walls of the oven. Such blowers produce a movement of hot air through the passageway 18 with the result that the lamps 15 are rapidly brought up to the elevated temperature of air.

While I have described the preferred embodiment of my invention, I do not wish to be limited to the exact structure shown as it will be understood and many modifications of the precise manner by which my invention is carred into effect, as well as the apparatus in which it is used, may be made without departing from the scope of the appended claims.

What I claim as new and desire to secure by Letters Patent of the United States is:

1. In combination, a machine having a carrier provided with heads for gripping and advancing a series of elongated lamps along a path of movement, a heating oven having walls forming a combustion chamber located in the path of movement of the lamps, said walls being provided with openings to permit movement of the lamps through the combustion chamber, air ducts in said chamber located in spaced apart relationship on opposite sides of said path of movement, said ducts having side walls facing said path and each being provided with a series of elongated openings adapted to direct air from within the ducts toward substantially the full length of both opposite sides of the lamps along the path of lamp movement, said elongated openings being formed in said walls to extend substantially the full vertical length thereof at predetermined spaced points thereon such that each elongated opening in one duct wall faces an elongated opening in the other duct wall, said openings being disposed at predetermined spaced points along the length of said duct walls, air heating means in said combustion chamber, a plurality of blowers in said chamber, and means to connect one of said blowers to one duct and the other blower to the other duct to convey heated air to said ducts, the ends of said ducts being spaced from the walls of the oven to permit flow of air from the area defining the path of lamp movement to other parts of said combustion chamber.

2. In combination, a machine having a carrier provided with heads for gripping and advancing a series of lamps along a path of movement, a heating oven having walls forming a combustion chamber located in the path of movement of the lamps, said walls being provided with openings to permit movement of lamps therethrough, elongated air ducts in said combustion chamber located in spaced apart relationship on opposite sides of said lamp path of movement, said ducts having side walls facing said path and each being provided with a series of elongated openings adapted to direct air from within the ducts toward opposite sides of the lamps along the path of lamp movement, said ducts having other side walls provided with vent openings to bypass excess air away from the lamps, air heating means in said combustion chamber, and means in said combustion chamber for blowing heated air to each of said ducts, the ends of said ducts being spaced from the walls of the oven to permit flow of air from the area defining the path of lamp movement over the ends of the ducts to other parts of said combustion chamber.

3. In combination, a machine having a carrier provided with heads for gripping and advancing a series of elongated lamps along a path of movement in a sequence of spaced index steps, means for indexing said machine to move said heads sequentially through the spaced index steps, a heating oven having walls forming a combustion chamber located in the path of movement of the lamps, said walls being provided with openings to permit movement of lamps through the chamber, elongated air ducts in said chamber located in spaced apart relationship on opposite sides of the path of lamp movement, said ducts having side walls facing said path and each being provided with a series of elongated openings at points corresponding to the spaced index steps taken by the lamps adapted to direct air from within the ducts toward substantially the full length of both opposite sides of the lamps along the path of lamp movement, said elongated openings being formed in said walls to extend substantially the full vertical length thereof at predetermined spaced points thereon such that each elongated opening in one duct wall faces an elongated opening in the other duct wall, said openings being disposed at predetermined spaced points along the length of said duct walls, air heating means in said combustion chamber, means to direct heated air through each of said ducts, and means to regulate the volume of air flowing through each of said elongated openings, the end of one of said ducts being spaced from the walls of the oven to permit flow of air from the area defining the path of lamp movement over the end of said duct to other parts of said combustion chamber.

References Cited in the file of this patent

UNITED STATES PATENTS

| | | |
|---|---|---|
| 1,763,418 | Cramer | June 10, 1930 |
| 1,775,302 | Williamson | Sept. 9, 1930 |
| 2,039,429 | Lydon | May 5, 1936 |
| 2,160,633 | Young | May 30, 1939 |
| 2,756,980 | Ott | July 31, 1956 |